United States Patent [19]

Polnik

[11] Patent Number: 5,288,280
[45] Date of Patent: Feb. 22, 1994

[54] STEPLESSLY ADJUSTABLE ROTARY TRANSMISSION

[76] Inventor: Artur Polnik, Oberrahser Str. 133, W-4060 Viersen 1, Fed. Rep. of Germany

[21] Appl. No.: 934,778

[22] Filed: Aug. 24, 1992

[30] Foreign Application Priority Data

Sep. 3, 1991 [DE] Fed. Rep. of Germany ... 9110908[U]

[51] Int. Cl.⁵ .................. F16H 15/54; F16H 15/48; B62M 11/14
[52] U.S. Cl. ..................... 475/185; 476/47; 476/50
[58] Field of Search ............. 475/162, 163, 166, 183, 475/185, 189, 195, 196, 219, 269; 476/38, 47, 50, 54

[56] References Cited

U.S. PATENT DOCUMENTS

| Re. 18,175 | 9/1931 | Erban | 475/196 X |
|---|---|---|---|
| 313,831 | 3/1885 | Metzger et al. | 476/47 X |
| 357,378 | 2/1887 | Fisher et al. | 476/47 X |
| 1,989,112 | 1/1935 | Ragan | 476/47 X |
| 2,595,439 | 5/1952 | Arato | 476/50 |
| 2,815,670 | 12/1957 | Jorgensen | 476/47 |
| 3,258,981 | 7/1966 | General | 476/38 X |
| 3,293,947 | 12/1966 | Chery | 475/185 X |
| 3,587,350 | 6/1971 | Wanlass | 475/163 |
| 3,596,467 | 8/1971 | Avery | 476/4 X |
| 3,628,388 | 12/1971 | Bouthors et al. | 476/47 X |
| 5,027,023 | 6/1991 | Koivikko | 475/196 X |

FOREIGN PATENT DOCUMENTS

| 211180 | 3/1957 | Australia | 476/38 |
|---|---|---|---|
| 1146321 | 3/1963 | Fed. Rep. of Germany | 476/50 |
| 257632 | 8/1949 | Switzerland | 476/38 |
| 376336 | 5/1964 | Switzerland | 476/50 |
| 654817 | 3/1979 | U.S.S.R. | 476/47 |
| 912626 | 12/1962 | United Kingdom | 475/189 |

Primary Examiner—Rodney H. Bonck
Attorney, Agent, or Firm—Mason, Kolehmainen, Rathburn & Wyss

[57] ABSTRACT

A transmission comprises a rotary input member, a rotary output member and a housing. Disposed in the housing is at least one rolling member such as a ball for transmitting a rotary movement between the rotary input and output member. The rolling member is arranged between at least first and second substantially circular tracks forming a gap that decreases in the peripheral direction. The rolling member is held in contact at a drive rolling radius with the one track and at a driven rolling radius with the other track, in the decreasing gap, by a positive-action guide.

9 Claims, 5 Drawing Sheets

STEPLESSLY ADJUSTABLE ROTARY TRANSMISSION

BACKGROUND OF THE INVENTION

Transmissions comprising a rotary input member, a rotary output member and a housing are known in different forms, comprising for example gear wheels or friction wheels. However, in the case of a gear wheel transmission, the level of efficiency thereof cannot be enhanced to a material degree, as a result of the friction which occurs between the meshing teeth of the gear wheels. In the case of friction wheel transmissions of conventional design configuration on the other hand, high pressure forces as between the co-operating friction wheels are required.

SUMMARY OF THE INVENTION

An object of the present invention is to provide a mechanical transmission which can afford a higher level of efficiency than prior mechanical transmissions.

Another object of the present invention is to provide a transmission which can afford enhanced versatility of use and which is capable of transmitting high levels of force.

Still another object of the present invention is to provide a mechanical transmission which can be of a compact structure while affording a substantial variation in transmission ratio.

In accordance with the principles of the present invention the foregoing and other objects are achieved by a transmission comprising a rotary input member, a rotary output member and a housing. At least one rolling member for transmitting rotary movement between the rotary input member and the rotary output member is arranged rollably between at least first and second substantially circular track means which form a gap that varies in the peripheral direction. The rolling member is held in contact at a first drive rolling radius with the one track means and at a second drive rolling radius with the other track means in said gap by a positive-action guide means.

As will be seen in greater detail hereinafter in relation to specific embodiments of the transmission according to the invention, such a mechanical transmission differs from a conventional friction wheel transmission in that it is not the peripheral force involved that is used for transmission of the power to be transmitted, but instead the drive force of the transmission is only used to urge the rolling member into the varying and more specifically decreasing gap, whereby a force is applied to the eccentric configuration, which is thus used as the driven force. More specifically, by virtue of the decreasing gap between the inner and outer substantially circular track means, the track means do not have a common center point. In operation, the rolling member is not braked but only rotated and can roll practically in an unloaded condition so that the rolling movement of the rolling body is approximately comparable to the low-loss rolling movement of a roller member of a roller bearing assembly.

In principle, the transmission according to the invention can be in the form of a rigid transmission. In accordance with a further preferred feature of the invention however the spacing between the contact locations of the rolling member with the outer track means and the inner track means is adapted to be adjustable by way of an adjusting means, thus forming a variable transmission unit. In that respect, there is then also the possibility of the transmission being so designed that it can be adjusted either steplessly or in steps. In the case of the transmission being steplessly variable, for example, the rolling member may be in the form of a ball, a barrel-like member, a cone member, for example with a double cone configuration, or any other suitable configuration.

In accordance with a further advantageous feature of the invention at least one of the track means may have an auxiliary transmission disposed upstream or downstream thereof, in relation to the direction of transmission of the force to be transmitted. Such an auxiliary transmission means that the transmission ratio can be enlarged or expanded. The auxiliary transmission may be for example in the form of a planetary transmission, a spur gear transmission, a bevel gear transmission or the like. One advantage of such an auxiliary transmission is inter alia that the loading on the rolling member is reduced, more specifically to a considerable degree. That then gives the advantage that the transmission can also be used for transmitting higher levels of power or higher forces. When the auxiliary transmission is of a suitable configuration, it is also possible to provide that the losses which occur at the output side are lower than the operating pressure forces which occur at the rolling member. That means that the speed loss which in principle occurs due to slippage of the rolling member is at least partially compensated by virtue of the action of the auxiliary transmission.

In another preferred embodiment of the invention it can be provided that the positive-action guide means is in the form of a mechanical pressure application means. The mechanical pressure application means may be arranged to operate for example pneumatically, hydraulically, electrically or magnetically.

If, starting from the largest width of the above-mentioned gap, one or more rolling members is or are provided only in the direction in which the width of the gap decreases, more specifically in the eccentric direction of rotation, then the transmission behaves as a freewheel assembly when a drive force is no longer applied to the transmission. A transmission of that configuration is therefore particularly advantageously suited for example as a bicycle transmission unit.

If on the other hand, starting from the largest width of the above-mentioned gap, one or more rolling members is or are provided towards both sides of that location, then the unit involves a positive drive action or a non-slip mode of operation under all conditions, and the output from the transmission therefore always follows the input to the transmission, in terms of the force to be transmitted.

Depending on the respective design configuration of the auxiliary transmission, in particular when using a planetary transmission assembly, it is possible to provide that the transmission can be shifted under load from a faster into a slower speed or conversely from a slower speed into a faster speed. In that respect slower speed means a higher transmission ratio and faster speeds means a lower transmission ratio. The possibility of switching from a faster to a slower gear is particularly advantageous when a transmission according to the invention of this configuration is used as a bicycle transmission unit as in that way for example on a hill the rider can shift under load from a lower transmission ratio or fast gear into a higher transmission ratio or slower gear. That gives the advantage that there is no loss of power as a result of the pauses or interruptions which are otherwise required during a gear-shift operation with a conventional transmission unit.

When the transmission according to the invention does not include an auxiliary transmission, shifting is possible under load from the lower gear into the faster gear.

In accordance with a further preferred feature of the invention, one track means for the rolling body may be formed by the annular ring gear of a planetary transmission while the other track means may be formed by an eccentric gear.

A further preferred feature of the invention can also provide that the one track means of a rolling member, which is in the form of a ball, is formed by the swash plate of a swash plate transmission while disposed downstream of the swash plate transmission, as an auxiliary transmission, is a planetary transmission. The other track means has an inner and an outer track ring which each rotate at the same speed and which are coupled in terms of speed of rotation to the ring gear of the planetary transmission, while the spacing between the inner and outer track rings relative to each other is adjustable, wherein the lines perpendicular to the tangents of the points of contact of the track rings with the ball forming the rolling member intersect at the ball center. The use of a ball as the rolling member in that construction makes it possible for the transmission ratio of the transmission to be adjusted. It will be appreciated that it is also possible, when employing a swash plate transmission, to use a rolling member which is not in the form of a ball, preferably when the transmission is not required to be adjustable.

Further objects, features and advantages of the present invention will be apparent from the following description of preferred embodiments.

DESCRIPTION OF THE PREFERRED EMBODIMENTS

Figure 1:
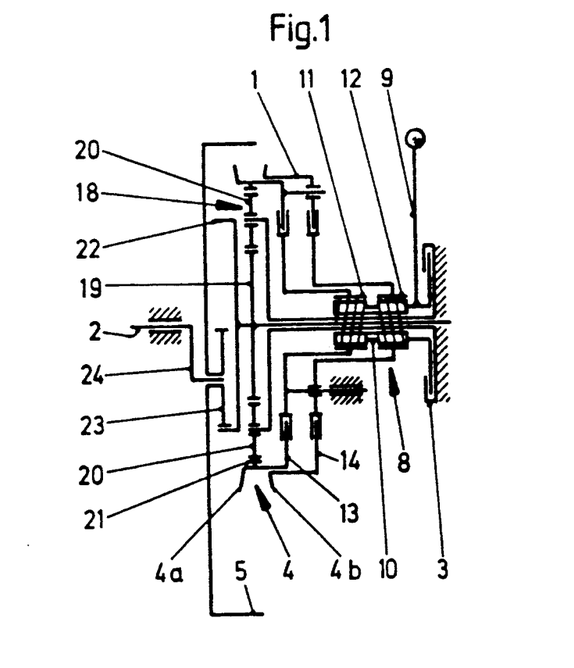
FIG. 1 is a diagrammatic view in longitudinal section showing the principle of an embodiment of a transmission in accordance with the present invention but without showing a rolling member thereof.

Referring firstly to the embodiment shown in FIGS. 1 through 6 and more specifically FIG. 1, reference numeral 1 therein identifies a rotary input member, reference numeral 2 denotes a rotary output member and reference numeral 3 denotes a housing. The regions indicated by hatching in FIG. 1 are parts of the housing 3.

Figure 2:
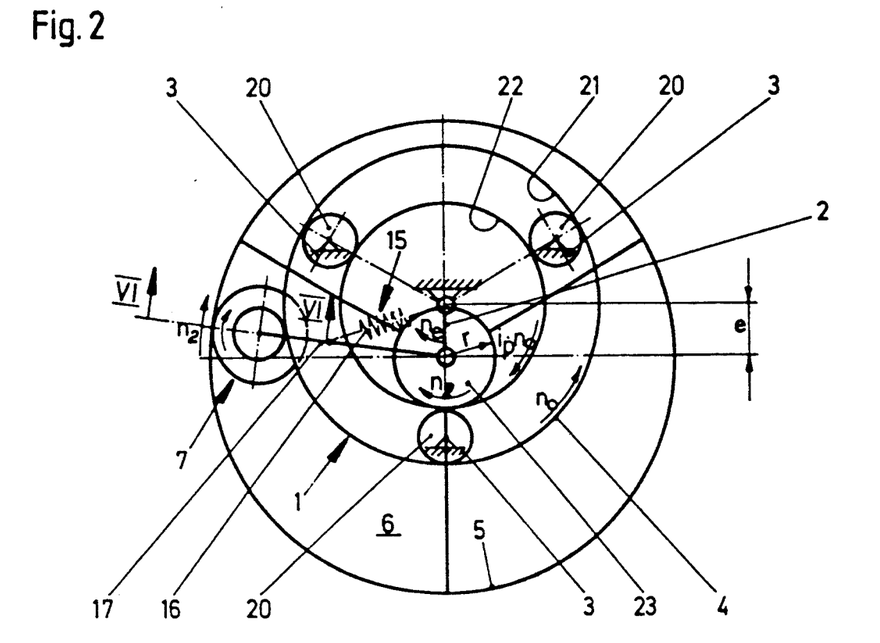
FIG. 2 is a diagrammatic side view of the transmission of FIG. 1, showing the rolling member but not illustrating the adjusting mechanism.
Figure 3:
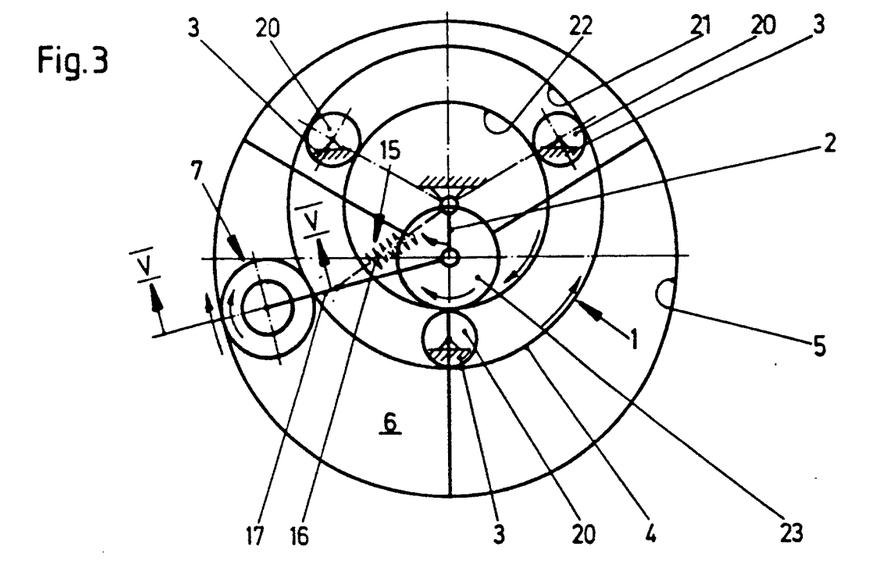
FIG. 3 is a view corresponding to that shown in FIG. 2, in which the inner track means is displaced relative to the position thereof shown in FIG. 2.

The rotary input member 1 has an inner track which is generally identified by reference numeral 4, for a rolling member which is not shown in FIG. 1 but which is indicated at 7 in for example FIGS. 2 and 3. An outer track is identified by reference numeral 5. The tracks 4 and 5 are of an at least substantially circular configuration but, as can be seen for example from FIGS. 2 and 3, the tracks 4 and 5 do not have a common center point so that a gap 6 which varies in its size in the peripheral direction is provided between the tracks 4 and 5. The above-mentioned rolling member 7 is disposed between the tracks 4 and 5, as can be seen from FIGS. 2 and 3, for transmission of the rotary movement therebetween. In the embodiment shown in FIGS. 1 through 6, the rolling member 7 is in the form of a double cone member, as is clearly apparent from FIGS. 5 and 6.

As can be seen in particular from FIGS. 2, 3, 5 and 6, the spacing between the contact locations of the rolling member 7 with the one track 4 and the other track 5 is adapted to be adjustable. For that purpose, the embodiment of FIGS. 1 through 6 provides that the track 4 has first and second track portions indicated for example at 4a and 4b in FIGS. 5 and 6. The track portions 4a and 4b are arranged to be displaceable relative to each other in the directions indicated by the arrows S in FIGS. 5 and 6. The adjusting movement is effected by way of an adjusting device which is generally indicated by reference numeral 8 in FIG. 1 and which, in the embodiment of FIGS. 1 through 6, is operable by actuation of a hand lever 9. The hand lever 9 can be arranged to be rotatable about the center line of the assembly. Thus, upon rotary movement of the hand lever 9, a screw 10 having a left-handed threaded portion and a right-handed threaded portion is also rotated. Associated with the left-handed threaded portion and the right-handed threaded portion of the screw 10 are respective female screw members or nuts 11 and 12 which are each connected rigidly in the axial direction to respective ones of the track portions 4a and 4b respectively by way of a respective connection as indicated at 13 and 14, which are rigid in the axial direction of the assembly. Accordingly, upon rotary movement of the hand lever 9 in one direction, the spacing between the track portions 4a and 4b is increased while upon rotary movement of the hand lever 9 in the opposite direction, that spacing is reduced.

Figure 5:
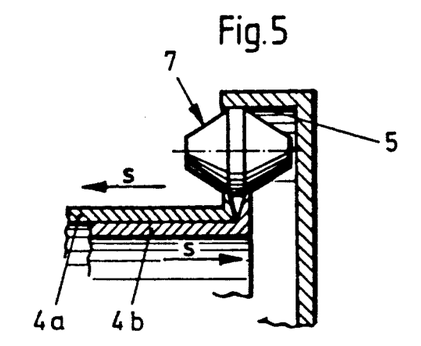
FIG. 5 is a view of a rolling member with the track means shown in section taken along line V—V in FIG. 3, for the structure shown in FIG. 4.
Figure 6:
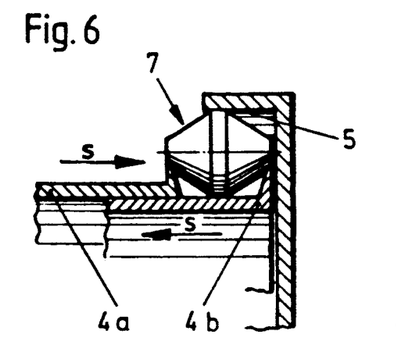
FIG. 6 is a view corresponding to FIG. 5, taken along section line VI—VI in FIG. 2.

The rolling member 7 is held in contact with the tracks 4 and 5 in the decreasing gap therebetween by a positive-action guide means 15 which is diagrammatically illustrated in FIGS. 2 and 3 and which therein comprises a tension spring 16 and a pivotally mounted lever 17 which carries the rolling member 7 and which is acted upon by the spring 16. FIG. 2 shows the condition of the assembly in which the track portions 4a and 4b are at the greatest spacing from each other, as shown in FIG. 6, while FIG. 3 shows the condition of the assembly corresponding to FIG. 5.

As the rotary movement to be transmitted by the transmission is transmitted between the rotary input member 1 and the rotary output member 2 by way of the tracks 4 and 5 and the rolling member 7 therebetween, and as moreover adjustment of the track portions 4a and 4b in the axial direction accordingly provides that the spacing between the points of contact between the rolling member 7 and the track 4 and the track 5 is adjustable by way of the adjusting arrangement 8, the transmission ratio of the transmission is accordingly adjustable. As a comparison between FIG. 5 and FIG. 6 shows, the rolling radius of the rolling member 7 remains unchanged, in relation to the track 5, while the rolling radius of the rolling member 7, in relation to the track 4 comprising the track portions 4a and 4b, is steplessly variable between the largest rolling radius as shown in FIG. 5 and the smallest rolling radius as shown in FIG. 6.

The above-described embodiment further includes an auxiliary transmission which is in the form of a planetary transmission as diagrammatically indicated at 18. The planetary transmission comprises a sun gear 19, stationary planet gears 20 and a ring gear 21 which at the same time forms the track 4, at its outer periphery. Non-rotatably connected to the sun gear 19 is a second planetary ring gear 22 within which is disposed a planet gear 23 which is non-rotatably connected to the outer track 5. The center point of the planet gear 23 is connected by way of a crank 24 to the rotary output member 2 which forms the output or driven part of the transmission.

Figure 4:
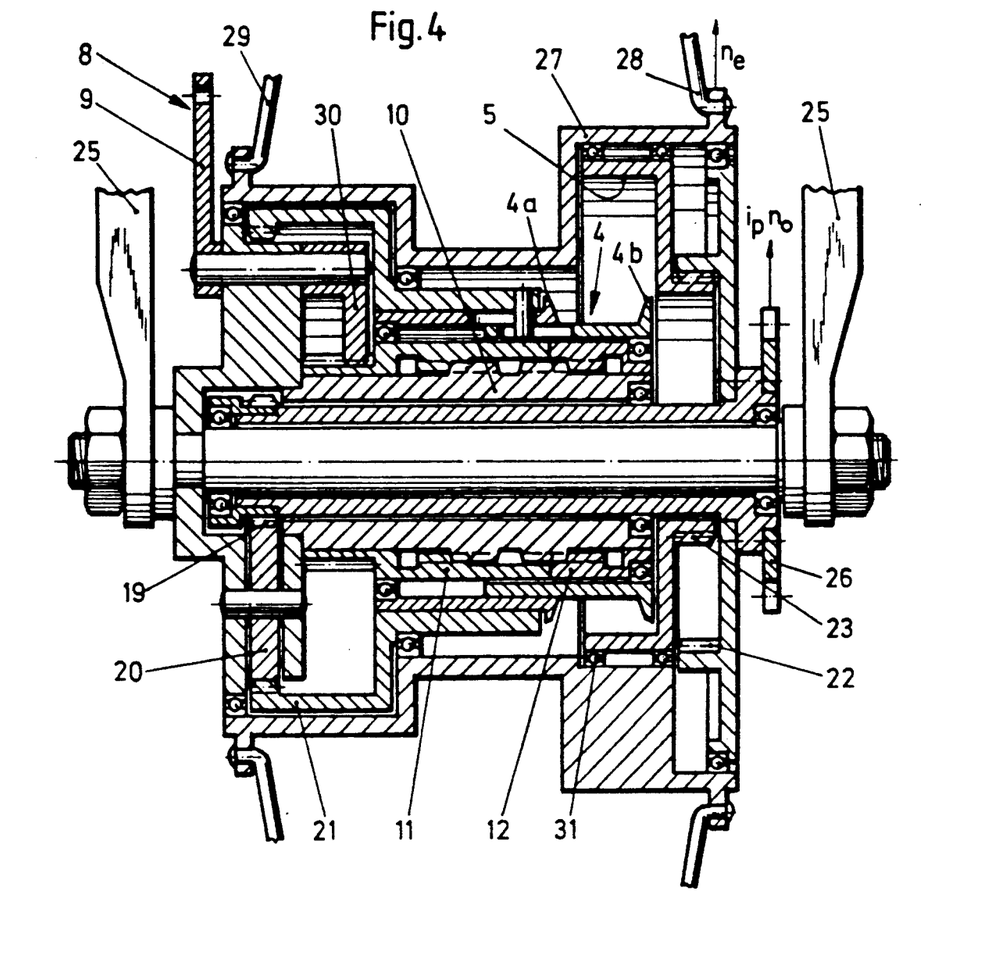
FIG. 4 is a view in section of the structure of an embodiment of the transmission as illustrated in FIGS. 1 and 2.

Reference will now be made to FIG. 4 showing in greater detail the structure of the embodiment of the transmission described with reference to FIGS. 1 through 6 above, in the form of a bicycle transmission. In FIG. 4, parts which have already been described above are identified by the same reference numerals.

Reference numeral 25 in FIG. 4 identifies the fork of the bicycle. A chain wheel or sprocket 26 forms the rotary input member of the transmission while housing indicated at 27, to which wheel spokes can be fixed as at 28 and 29 forms the rotary output member of the transmission.

Adjustment of the adjusting mechanism 8 can be effected by way of a lever 9 which is connected to a toothed segment-shaped member 30 which can rotate the respective nuts 11 and 12 co-operating with the screw 10.

As other components in FIG. 4 correspond to the foregoing description set forth with reference to FIGS. 1 through 6 generally, those components do not need to be described in full detail again. It will be noted however that, in place of the crank 24 shown in FIG. 1, the structure shown in FIG. 4 has a ball bearing 31 which is mounted in the housing 3 eccentrically relative to the center line. The eccentricity of the mounting of the ball bearing 31 corresponds to the eccentricity as indicated at e in FIG. 2 in terms of the mounting of the planet gear 23.

In relation to the embodiment shown in FIGS. 1 through 6, $n_O$ identifies the input speed of the track 4 and $n_2$ identifies the speed of the track 5. Reference $i_{pnO}$ identifies the input speed of the planetary transmission while $n_e$ identifies the output speed. It will be seen by the arrows associated with $n_2$ and $n_e$ that the directions of rotations of the track 5 and the rotary output member 2 are opposite.

Figure 7:
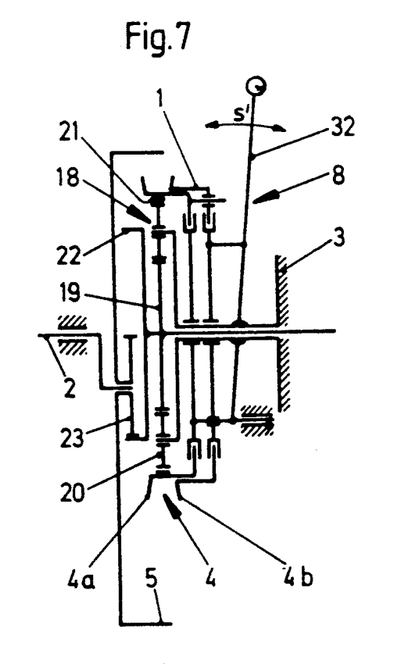
FIG. 7 is a view corresponding to that shown in FIG. 1 in regard to a further embodiment of the invention with a different adjusting mechanism.

Reference will now be made to FIG. 7 showing a transmission which differs in principle from that shown in FIGS. 1 through 6 only by virtue of the adjusting mechanism 8 being of a different configuration. This embodiment of the invention has an adjusting lever 32 which is pivotable in the axial direction of the assembly as indicated by the double-headed arrow S'. It will be apparent that accordingly the axial spacing between the track portions 4a and 4b is adjustable in that way. In other respects the FIG. 7 construction corresponds to that shown in FIG. 1 and the description of the latter will not therefore be repeated at this point.

Figure 8:
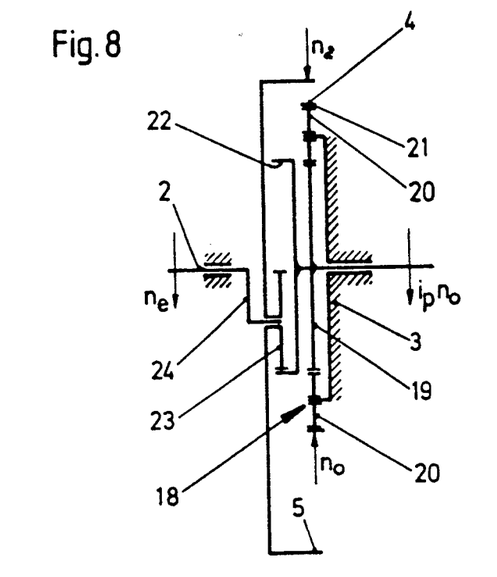
FIG. 8 is a view of a further embodiment of the invention without the adjustment option.

Structures according to the invention having been described, the mode of operation in principle of a transmission according to the invention will now be described with reference to FIG. 8 which however does not show an adjusting mechanism.

The input speed of rotation as indicated at $i_{pnO}$ is transmitted by the ring gear 22 of the planetary transmission to the planet gear 23 which is rigidly connected to the track 5. The other track 4 is formed on the ring gear 21. The rotary movement and also the drive force is transmitted to the ring gear 21 from the track 5 by way of the rolling member (not shown in FIG. 8 but identified at reference numeral 7 in other Figures) which is disposed between the track 5 and the track 4 and which is positively held in the decreasing gap therebetween. From the ring gear 21, the planet gears 20 are driven, which are in turn connected to the input shaft again by way of the sun gear 19.

The rotary output member 2 is connected to the planet gear 23 for rotary movement, by way of the crank 24. The planet gear 23 rotates about its own axis and also rotates at the speed of rotation of the crank 24 in the ring gear 22, more specifically at the output speed as identified by $n_e$. The output speed $n_e$ is variable, more specifically in dependence on the rolling radius of the rolling member 7 against the track 4, more particularly by virtue of the track portions 4a and 4b being adjustable relative to each other in the manner clearly apparent in FIGS. 5 and 6. As a result of the above-described feed-back effect with the sun gear 19 and thus with the rotary input member, the system involves a positive or fixed transmission mode, that is to say the arrangement does not act as a free-wheel unit. The transmission ratio then depends exclusively on the spacing between the points of contact of the rolling member 7 with the tracks 4 and 5.

Figure 9:
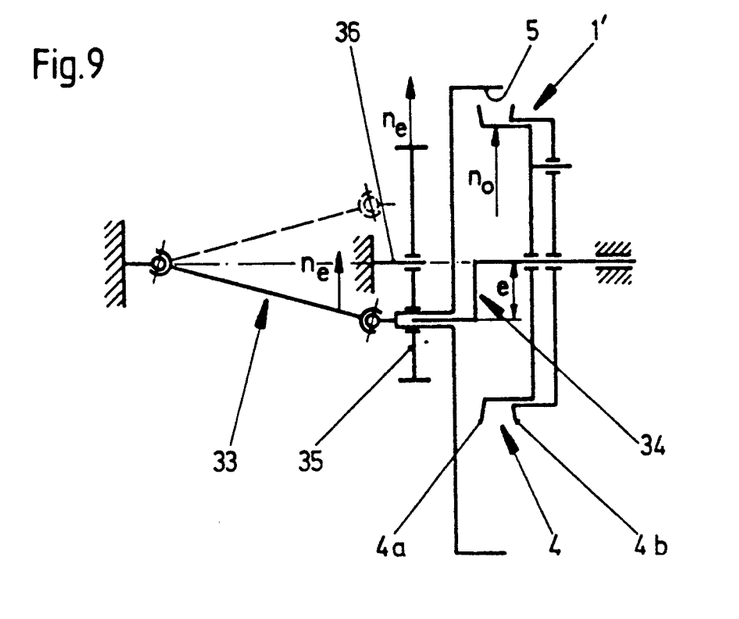
FIG. 9 is a diagrammatic view of a further embodiment of the invention, without an auxiliary transmission incorporated therein.

Referring now to FIG. 9, diagrammatically shown therein is a further embodiment of the invention without an auxiliary transmission and without illustrating the adjusting means. In the structure shown in FIG. 9, the rotary input member which is here identified by reference numeral 1' is at the same time that member which has the track 4 formed by the track portions 4a and 4b. The means required to provide the drive are not shown in the drawing. The adjusting means for axial adjustment of the track portions 4a and 4b may be for example of the configurations shown in FIG. 1 or FIG. 7. Details in that respect are not shown.

In addition, the rolling member 7 which is disposed between the track portions 4a, 4b on the one hand and the track 5 on the other hand is also not shown in FIG. 9 but it will be appreciated that the input drive movement is transmitted to the track 5 by way of the rolling member. The track 5 is arranged non-rotatably and is more specifically prevented from rotating by means of a fixed cardan or universally jointed shaft as diagrammatically indicated at 33. The result of that configuration is that, upon joint rotation of the track portions 4a and 4b, the rolling member rolls along between the track portions 4a and 4b and the stationary track 5. The track 4 and the track 5 do not have a common center point but the center point of the track 4 is displaced relative to the center point of the track 5 by way of a crank indicated at 34, with a degree of eccentricity as indicated at e.

An output or driven wheel 35 is arranged rotatably about a stationarily disposed shaft 36. The crank 34 connected to the track 5 engages into the driven wheel 35, outside the center point thereof. The driven or output speed $n_e$ can be taken off at the outside periphery of the driven or output wheel 35. The output or driven wheel 35 is rotated about the shaft 36 by the crank 34, while the track 5 is supported with respect to the stationary housing of the assembly by the shaft 33. FIG. 9 also shows in broken line the position occupied by the shaft 33 upon a rotary movement of the driven or output wheel 35 through 180°, relative to the position shown in solid line.

A general underlying principle of the invention is now described with reference to FIG. 10. The view shown in FIG. 10 corresponds in principle to the view shown in FIG. 8, but without the planetary transmission illustrated in the latter. Unlike FIG. 8, disposed outside the track 5 is a ring gear 37 which is disposed non-rotatably. The track 5 is arranged to rotate eccentrically within the ring gear 37. Once again FIG. 10 does not show the rolling member disposed in the gap between the track 4 and the outer track 5.

Figure 10:
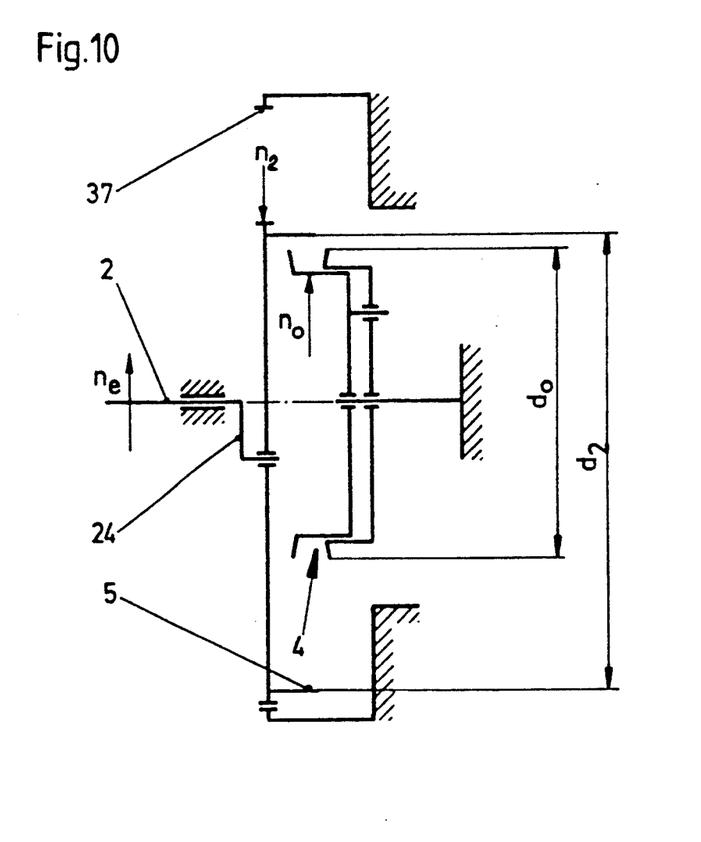
FIG. 10 is a further embodiment of the invention, also without an auxiliary transmission.

It will be seen that the rotary input movement is imparted to the track 4, the rotary input motion being identified by $n_O$ in FIG. 10 while the rotary output motion is identified by $n_e$.

The rolling diameter of the track 4 is identified by $d_O$ and the rolling diameter of the outer track 5 is identified by $d_2$. The rotary speed of the track 5 is identified by $n_2$. As indicated by the arrows at $n_2$ and $n_e$ the directions of rotation of the track 5 and the rotary output member 2 are in opposition to each other.

It is also possible to provide for further structural configurations of the transmission according to the invention, more specifically when they comply with the following condition:

$$n_2 \cdot d_2 \neq n_O \cdot d_O.$$

If more specifically the two values were equal, that would mean that the output speed $n_e$ is of a value 0, as in that case the rolling member 7 is admittedly rotated but the rolling member remains in a stationary position and no longer moves in the manner of a planetary gear about the drive assembly in the decreasing gap with the decrease in the size of the gap passing around the periphery of the assembly, in the manner described hereinbefore.

Figure 11:
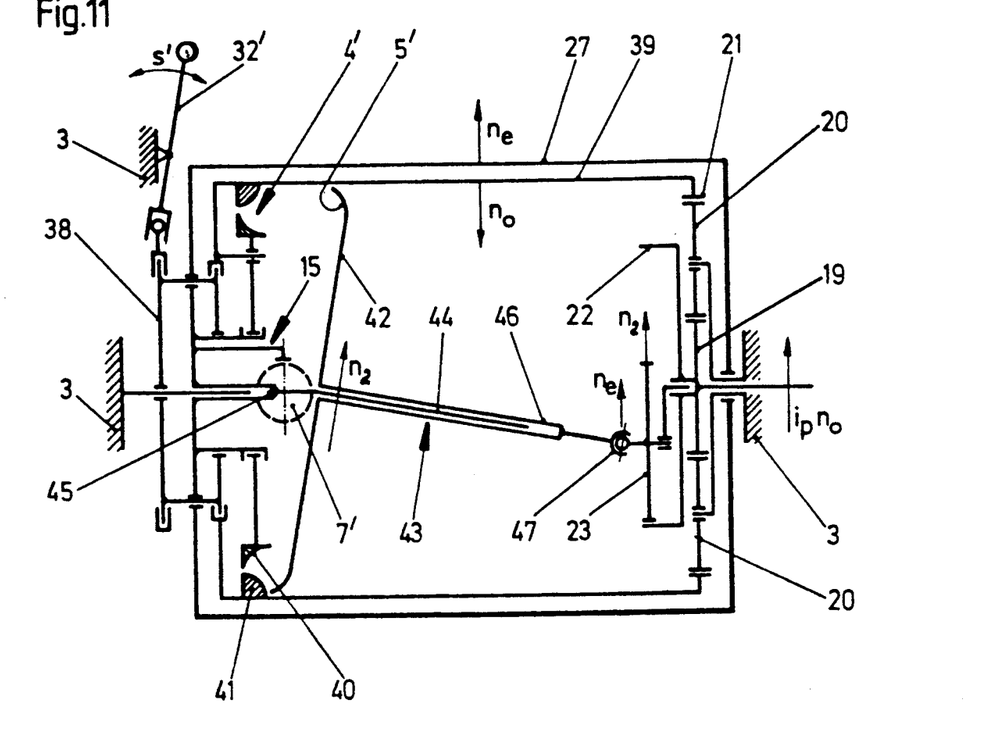
FIG. 11 is a diagrammatic view of a further embodiment of the invention in which one track means for the rolling member is in the form of a swash plate of a swash plate transmission and a planetary transmission is disposed downstream of the swash plate transmission, as the auxiliary transmission.

Reference will now be made to FIG. 11 showing a further embodiment in which components which have already been described with reference to preceding Figures are identified by the same reference numerals. Components which perform the same functions are identified by the same reference numeral but with the addition of a prime ('), thus for example the adjusting lever which is indicated at 32 in FIG. 7 is identified by reference numeral 32' in FIG. 11.

Upon actuation of the adjusting lever 32' in the direction indicated by the double-headed arrow s', a sleeve-like member 39 is displaced in the axial direction of the assembly by way of a wheel 38 rotates relative to the adjusting arrangement. The member 39 has an outer track ring as indicated at 41. In the illustrated embodiment, an inner track ring as indicated at 40 is not displaceable in the axial direction while another outer track ring 41 is displaceable by actuation of the adjusting lever 32' in the direction s'. It is in principle also possible for the inner and outer track rings each to be arranged to be displaceable. The track rings 40 and 41 are displaceable relative to each other between the respective positions shown in FIGS. 12 and 13, by displacement of the track ring 41 in the direction indicated by the arrow s'', the track rings 40 and 41 of FIG. 12 being identified by references 40' and 41' in FIG. 13.

The track rings 40 and 41 form the one track which is here identified by reference numeral 4'. The other track which is here identified by reference numeral 5' is formed by part of a swash or nutating plate 42 of a swash plate transmission which is generally identified by reference numeral 43 in FIG. 11. The plate 42 is disposed on an angled shaft 44 which is rigidly connected to the housing 27 at 45. Reference numeral 46 identifies a mounting or support tube member 46 of the plate 42, which is non-rotatably connected to the planet wheel 23 by way of a cardan joint 47 so that as a result the plate 42 rotates at the same speed as the planet wheel 23.

Figure 12:
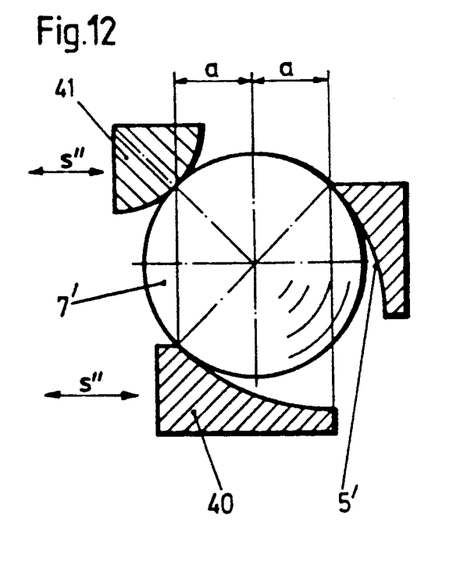
FIGS. 12 and 13 are diagrammatic views corresponding to those shown in FIGS. 5 and 6 respectively, showing the track means in section, illustrating a rolling member therebetween, in the form of a ball.
Figure 13:
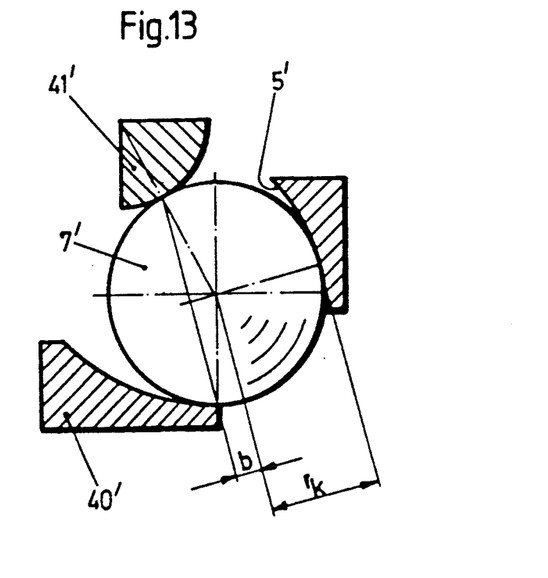

In the present construction the rolling member disposed between the tracks 4' and 5' is in the form of a ball 7' as indicated in FIGS. 12 and 13. The ball 7' is disposed displaced through 90° relative to the plane of the sheet, at the track 5'.

In regard to the principle involved, the construction shown in FIG. 11 differs in that one of the tracks in this embodiment is formed by the plate 42. In the previously described embodiments, the loading of the rolling member 7 depends inter alia on the degree of eccentricity e. In comparison, in the FIG. 11 construction, the loading of the rolling member which in this case is the ball 7' depends on the radius of the plate 42. The greater the radius of the plate 42, the lower is the loading on the rolling member. That has the advantage that in principle the construction with such a plate 42 can transmit greater forces, for the same external geometry. It will be noted that the pressure of the rolling member, in relation to unit area, should not exceed a certain values as that could result in damage to or destruction of the rolling member and/or the tracks.

It will be noted that the above-described constructions have been set forth solely by way of example and illustration of the principle of the present invention and that various modifications and alterations may be made therein without thereby departing from the spirit and scope of the invention. For example, the adjusting mechanism may be a stepless mechanism or it may provide for adjustment in one or more shifting steps. The positive-action guide means for holding the rolling member in contact with the respective tracks in the decreasing gap therebetween may be a magnetic, pneumatic, hydraulic or electrical pressure application arrangement, and so forth.

What is claimed is:

1. A transmission comprising a housing, a rotary input member, a rotary output member, at least a first and a second at least substantially circular track means forming therebetween a gap which decreases in the peripheral direction, at least one rolling member arranged rollably between said track means and adapted to transmit rotary movement between the rotary input member and the rotary output member, a positive-action means adapted to hold the rolling member in contact at a drive rolling radius with one of said first and second track means and at a driven rolling radius with another of said first and second track means in said decreasing gap, steplessly adjustable adjusting means for adjusting the spacing between contact location of the rolling member with said one of said first and second track means and said other of said first and second track means, and auxiliary transmission means operatively associated with at least one of said first and second track means.

2. A transmission as set forth in claim 1 wherein said auxiliary transmission means is driven by at least one of said first and second track means.

3. A transmission as set forth in claim 1 wherein said auxiliary transmission means is drivingly interconnected to at least one of said first and second track means.

4. A transmission as set forth in claim 1 wherein said auxiliary transmission means comprises a planetary transmission.

5. A transmission as set forth in claim 4 including a swash plate transmission and wherein said planetary transmission means is driven by said swash plate transmission.

6. A transmission as set forth in claim 1 wherein said positive-action means is in the form of a mechanical pressure application means.

7. A transmission as set forth in claim 1 including a swash plate assembly having a swash plate providing one of said first and second track means.

8. A transmission as set forth in claim 7 including a planetary transmission means acting as an auxiliary transmission for said swash plate assembly wherein said rolling member comprises a ball member, and wherein the other of said first and second track means has a respective inner and outer track ring which are each adapted to rotate at the same speed and which are coupled in respect of speed of rotation to the ring gear member of the planetary transmission and the spacing of which is adjustable relative to each other, lines perpendicular to the tangents of the points of contact of the track rings with the rolling ball member intersecting at the ball center.

9. A transmission comprising: a rotary input member; a rotary output member; first and second at least substantially circular rolling track means each operatively associated with respective ones of said rotary input member and said rotary output member and disposed one within the other in eccentric relationship with each other thereby to define therebetween a gap whose width in a radial direction relative to said rotary input and output members varies in the peripheral direction of the gap; at least one rolling member arranged rotatably in said gap between said first and second track means for rolling contact therewith, thereby to transmit a rotary movement between the track means and accordingly between the rotary input and output members; and a means adapted to urge said rolling member into contact at a drive rolling radius with one of said first and second track means operatively associated with the rotary input member and at a driven rolling radius with the other of said first and second track means operatively associated with the rotary output member, steplessly adjustable adjusting means for adjusting the spacing between contact locations of the rolling member with said one of said first and second track means and said other of said first and second track means, and auxiliary transmission means operatively associated with at least one of said first and second track means.

* * * * *